United States Patent Office 3,342,538
Patented Sept. 19, 1967

---

3,342,538
METHOD OF INCREASING THE MAXIMUM OPERATING TEMPERATURE OF A RADIATION DETECTION DEVICE
Nicolas Mitrofanov, Cleveland, Ohio, assignor to Kewanee Oil Company, Bryn Mawr, Pa., a corporation of Delaware
Filed June 24, 1966, Ser. No. 560,220
30 Claims. (Cl. 316—22)

ABSTRACT OF THE DISCLOSURE

This invention comprises a method for increasing the maximum temperature of a radiation detection device, which device includes a chamber, a large area electrode surface formed from a selected metal and located in the chamber, and a second electrode in the chamber spaced from the said surface, by the steps of: (a) filling the chamber with a gaseous material having at least some halogen gas; (b) passing an electric current between the two electrodes to cause the halogen gas to be absorbed by the selected metal; (c) purging the chamber of the gaseous material; (d) filling the chamber with a second gaseous material which is ultimately to be used in the chamber, this second gaseous material also including some halogen gas; (e) sealing the chamber; (f) heating the device gradually to a temperature $t_1$ and allowing the device to cool, and (g) repeating the heating and cooling step $n$ times with the heating being carried to successively higher temperatures $t_2, \ldots t_n$, with $n$ being at least 3 and $t_n$ being a temperature equal to or higher than the desired maximum operating temperature for the device.

---

This invention pertains to the art of producing radiation detection devices, and more particularly to a method of increasing the maximum operating temperature of such a device.

The invention is particularly applicable for increasing the maximum operating temperature of a Geiger-Mueller counting tube, and it will be described with particular reference thereto; however, it will be appreciated that the invention has much broader applications and may possibly be used to increase the maximum operating temperature of various other radiation detection devices of the type including a gas filled ionization chamber with two spaced electrodes.

Geiger-Mueller counting tubes have been used for some time to detect and measure radiation levels from various sources. These tubes generally include an ionization chamber having a large hollow, first electrode and a somewhat centrally disposed second electrode. By applying a relatively high voltage across the electrodes, radiation encountered by the ionization chamber causes electrical impulses, or counts. The number of counts per unit time, or counting rate, is proportional to the amount of radiation being encountered by the counting tube. Exterior electrical equipment or circuits translate the counting rate into a reading indicative of the radiation level. The quality of these known Geiger-Mueller counting tubes is generally determined by certain well defined operating parameters; and, before the advantages of the present invention can be fully appreciated, some of the more critical operating parameters of these tubes should be mentioned.

Probably the most important operating characteristics of a Geiger-Mueller counting tube are exhibited by a curve formed by plotting the counting rate, or counts per unit time, of a given tube against the voltage applied across the electrodes of the tube, while both the radiation level and the ambient temperature of the tube are held constant. This curve, hereinafter referred to as the tube characteristic curve, generally includes a relatively flat intermediate portion, where a change of applied voltage has relatively little effect on the counting rate of the tube. In the art of counting tubes, this generally flat portion of the characteristic curve is known as the "plateau" of the tube. Two aspects of the plateau are extremely important in the successful operation of the tube. First, the plateau must be relatively long, i.e. the counting rate must be relatively constant with widely varying applied voltages. If the characteristic curve of the tube does not have a long plateau, the counting rate, or radiation reading, will change during use when the applied voltage changes, irrespective of actual fluctuations in the encountered radiation level. It is well known that the applied voltage across the electrodes of the tube cannot be controlled closely while the tube is being used in the field. The counting rate of the tube must not be a reflection of variation in the applied voltage, and this is assured only if the plateau of the tube is sufficiently long to include the normal changes in the applied voltage.

Secondly, it has been found that the plateau of Geiger-Mueller tube, although ideally flat, does generally have a slight upward slope as the applied voltage across the electrodes of the tube increases. Since the applied voltage in the field often varies, as mentioned above, accurate radiation readings by the tube are possible only when the slope of the plateau is relatively small. In summary, in an accurate counting tube, the plateau must be sufficiently long to encompass all normal variations in applied voltage and the slope of the plateau must be relatively small so that changes in the applied voltage in the plateau range cause only slight variations of the tube's output or counting rate.

Other operating characteristics of a Geiger-Mueller counting tube are also important to satisfactory operation of the tube. For instance, the counting tube should have a relatively high sensitivity. "Sensitivity" is generally defined at the rate of counts per radiation level. In other words, it is desirable that the number of counts per unit time be as high as possible when the tube is subjected to a given radiation level. This requirement is correlated with another desired characteristic of a Geiger-Mueller counting tube. The sensitivity, i.e. the counting rate for a given radiation level, should not shift substantially over the operating temperature range of the tube. If this characteristic is not built into the tube, the radiation reading, or the counting rate of the tube, will reflect variations in temperature, as well as variations in radiation levels; and, false radiation readings will result. Since the sensitivity of these tubes does generally shift with temperature changes, a maximum operating temperature is a parameter essential to accurate use of the tube. A tube will have only minor changes or shifts in sensitivity when operated below this temperature. This aspect will be discussed in detail later. The last operating parameter of a Geiger-Mueller counting tube, which is somewhat critical, is the starting voltage for tube operation. It is desired to have the tube operate with an applied voltage having a low magnitude.

Taking all of these factors and characteristics into consideration, Geiger-Mueller counting tubes have heretofore had one primary limitation. They have had a relatively low rated, maximum operating temperature. For prior tubes this maximum temperature has been generally in the neighborhood of 175° C. Many environments in which a Geiger-Mueller counting tube could be used have an ambient temperature higher than the maximum operating temperature heretofore obtainable. The use of Geiger-Mueller counting tubes in these high temperature environments was previously impractical, if not impossible. When a prior Geiger-Mueller counting tube was operated at a temperature substantially over its maximum rated temperature, the plateau became short. Indeed, the plateau often disappeared. The slope of the plateau became exceedingly high, and the sensitivity was shifted drastically with changes in temperature. Attempts to provide cooling devices for these tubes have been generally ineffective and/or costly. For these reasons, there has been a great demand for a Geiger-Mueller counting tube which has a relatively high maximum operating temperature, i.e. a temperature approaching 350° C.

The present invention is directed toward a method of producing a Geiger-Mueller counting tube, or a similar radiation detecting tube, which increases the maximum operating temperature so that the tube may operate at a higher temperature than heretofore possible without drastically reducing the length of the plateau, increasing the slope of the plateau, changing the sensitivity of the tube or increasing the shift in sensitivity for temperature variations below the maximum operating temperature.

In accordance with the present invention, there is provided a method of increasing the maximum operating temperature of the radiation detection device including a chamber wherein ionization events occur, hereinafter referred to generally as a chamber or as a chamber of a Geiger-Mueller counter, a large area electrode surface formed from a selected metal and located within the chamber, and an electrode in the chamber and spaced from the first-mentioned electrode surface. This method comprises the steps of: filling the chamber with a gaseous material including at least some halogen gas; passing an electrical current between the electrode and the electrode surface to cause the halogen to be absorbed by the selected metal; purging the gaseous material from the chamber; filling the chamber with a second gaseous material which is to be ultimately used in the chamber, this second gaseous material including at least some of the halogen gas mentioned before; sealing the chamber; heating the device gradually to a temperature $t_1$ and allowing the device to cool; and, repeating the heating and cooling steps $n$ times with the heating being to successively higher temperatures $t_2, \ldots t_n$, with $n$ being at least 3 and $t_n$ being a temperature generally equal to or higher than the desired operating temperature of the device.

In accordance with another aspect of the present invention, the method described above includes the initial steps of: filling the chamber with oxygen gas; passing a current between the electrode surface and the electrode to cause oxidation of the surface; and, purging the oxygen from the chamber.

The primary object of the present invention is the provision of a method of producing a radiation detecting and measuring device having a higher maximum operating temperature than heretofore obtainable.

Another object of the present invention is the provision of a method of producing a Geiger-Mueller counting tube having a higher maximum operating temperature than heretofore obtainable.

Another object of the present invention is the provision of a method of producing a radiation detecting device including a chamber with two spaced electrodes, which method includes treatment of the surface of at least one electrode to increase the maximum operating temperature of the device.

Yet another object of the present invention is the provision of a method of producing a radiation detecting device including a chamber with two spaced electrodes, which method includes oxidizing the surface of at least one electrode, and then saturating the oxidized surface with a quenching gas used in the operation of the tube.

Still another object of the present invention is the provision of a method of producing a radiation detecting device including a chamber with two spaced electrodes, which method includes oxidizing the surface of at least one electrode and then saturating the oxidized surface with a halogen gas, such as Bromine.

These and other objects and advantages will become apparent from the following description used to illustrate the preferred embodiment of the invention as read in connection with the accompanying drawings in which:

FIGURE 4 is a flow diagram illustrating the preferred embodiment of the present invention; and, FIGURE 5 is an enlarged cross-sectional view illustrating an aspect of the method contemplated by the present invention.

Figure 1:
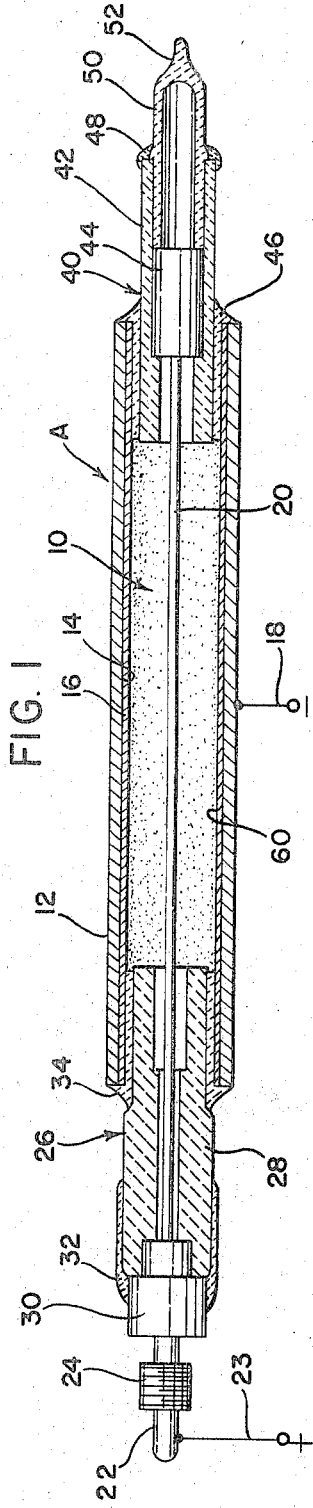
FIGURE 1 is a cross-sectional view illustrating a Geiger-Mueller counting tube of the type preferably used in the present invention.

Referring now to the drawings wherein the showings are for the purpose of explaining the preferred embodiment of the invention only and not for the purpose of limiting same, FIGURE 1 shows a Geiger-Mueller counting tube A having a somewhat conventional configuration and including an inner chamber 10 which is filled with a gaseous material to be ionized. Various gaseous mixtures can be used in chamber 10; however, in practice, the gaseous material is a mixture including approximately 0.1% argon, a noble, monatomic gas, 1.5% bromine, a diatomic gas, and the remaining neon, another monatomic gas. As is common practice, the bromine, gas within the Geiger-Mueller counting tube is used as a quenching gas so that the Geiger-Mueller counting tube A is a self-quenching type of counting tube.

Although the particular configuration of tube A does not form a part of the invention, as illustrated, the tube includes an outer cylindrical electrode 12 formed from stainless steel and including an inner, generally cylindrical surface 14. A thin layer 16 of platinum is electroplated onto surface 14 to a depth of approximately 15 microns. It is appreciated that the platinum may be absent in some tubes. Electrode 12 is provided with an electrical connection 18 adapted to be coupled with the negative terminal of a voltage source or grounded. Concentrically located with respect to electrode 12, there is provided a wire-like electrode 20 having an outwardly protruding terminal end 22 adapted to be connected by connection 23, with the positive terminal of the voltage source. Terminal end 22 is provided with a threaded coupling 24 for mounting the tube A into an appropriate radiation counting and measuring system, not shown. End 22 is provided with a coupling 26 including a vitreous plug 28 which surrounds and abuts a collar 30 formed integrally with electrode 20. To seal hermetically the chamber 10, the coupling 26 is provided with glass seals 32, 34. At the opposite end of the electrode 20, there is provided a second end coupling 40. This coupling includes a vitreous plug 42 surrounding a collar 44. Heat seals 46, 48 hermetically seal the plug 42 with respect to the electrode 12. A filling spout 50 is used to introduce a desired gaseous material within chamber 10 around collar 44. Thereafter, the spout 50 is heated until the glass material forming the spout may be necked down and closed at seal 52. As so far explained, the tube A does not substantially differ from known Geiger-Mueller counting tubes.

Figure 2:
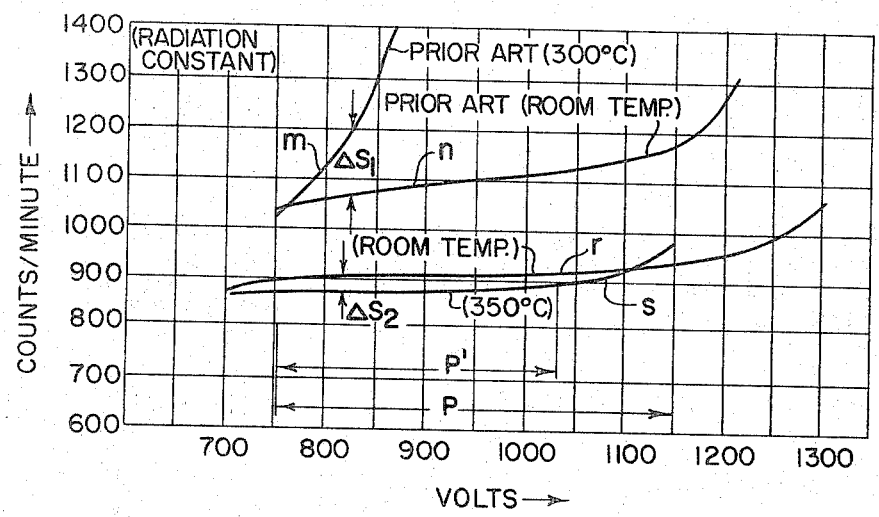
FIGURE 2 is a graph illustrating certain characteristics of a tube processed in accordance with the prior art and of a tube processed in accordance with the present invention.

Referring now to FIGURE 2, the operating characteristics of tube A, when not treated in accordance with the invention to be hereinafter described, are illustrated by curves $m$ and $n$. The graph in FIGURE 2 has the voltage applied across connections 18, 23 plotted on the abscissa and counting rates, count/minutes, plotted on the ordinate. Both the radiation intensity and the temperature are held constant during the perparation of each curve m and n. These curves are plotted by gradually increasing the applied voltage and measuring the counting rate while the temperature of the tube is held constant.

Curve n represents the prior art counting tube when operated at room temperature. As noted, the starting voltage of curve n is approximately 750 volts and the plateau, or generally flat portion, of curve n extends to approximately 1,050 volts. Curve n illustrates that the voltage can vary somewhat along the flat portion of the room temperature curve without drastic changes in the counting rate. This results in a relatively constant counting rate irrespective of normal variations in the applied voltage. The slope of the curve does introduce certain variations as the voltage changes; however, these are within allowable limits in normal Geiger-Mueller tube installations. Curve n indicates that the prior Geiger-Mueller counting tubes have been generally satisfactory for low temperature uses, such as room temperature uses.

In many installations, it is necessary to operate the counting tube A at a relatively high environmental temperature. Prior tubes have been limited to temperature in the neighborhood of 175° C., i.e. they maintained a distinguishable plateau only at temperatures below 175° C. Curve m indicates the operating characteristics of the prior Geiger-Mueller counting tubes when used in an installation having an environmental temperature of approximately 300° C. This curve m depicts the deficiences of the prior counting tubes at elevated temperatures. The plateau, or relatively flat horizontal portion of the curve, is completely missing. Slight variations in applied voltage resulted in substantial changes in the counting rate. Indeed, the counting rate was changed from approximately 1100 counts/minute at 800 volts to approximately 1300 counts/minute at 850 volts. Consequently, since the radiation remains constant while plotting curve m, slight variations in the applied voltage caused inaccurate readings of the actual radiation encountered by the prior art counting tubes. For these reasons, the prior tubes could not operate with any accuracy at temperatures in the neighborhood at 300° C. Another aspect of the prior art counting tubes is illustrated by viewing curves m and n together. At approximately 825 volts, the counting rate varied from approximately 1,050 counts/minute to approximately 1200 counts/minute. Thus, $\Delta S_1$ or sensitivity shift at 825 volts was 150 counts/minute. This means that variations in radiation readings of these prior tubes could result from changes in temperatures instead of changes in the actual radiation being measured.

The reason for the disappearance of the all important plateau at elevated temperatures in the prior art devices is probably attributed to a number of factors; however, it is believed that the plateau is lost at higher temperatures because, at these temperatures, the quenching gas, in this case a halogen, such as bromine, within the ionization chamber actually reacts with the surface 14. In addition, it is believed that the higher temperatures cause an increased secondary electron emission from the negative surface 14 when positive ions bombard this heated surface. Still another possible cause for the failure of these prior tubes at high temperature is that the surface 14, or more specificially platinum layer 16, emits gases having high electron attachment coefficient, such as oxygen. These gases then combine with certain gases within the ionization chamber to change the operating characteristics of the chamber upon exposure to a radiation source.

The inability of prior Geiger-Mueller counting tubes to operate properly at elevated temperatures is completely overcome by the present invention which is directed toward a method of treating the surface 16 to prevent this surface from detrimentally affecting the gases within the ionization chamber at an elevated temperature, such as 350° C.

The preferred embodiment of the present invention is schematically illustrated by the flow diagram or chart shown in FIGURE 4. This preferred embodiment of the invention includes six separate procedural steps designated I–VI. To better appreciate each of these processing steps, they will be hereinafter explained separately.

I. OXYGEN GLOWING (DIRECT CURRENT)

The chamber 10, in accordance with the invention, is first filled with substantially pure oxygen at a pressure of approximately 3 mm. Hg, and a high voltage direct current power source is applied across connections 18, 23, with the negative voltage terminal of the source coupled onto connection 18. The power source preferably has an output voltage of 500–1000 volts, which voltage is sufficiently high to cause the gas in the tube to ionize. This releases positive oxygen ions which progress to the negative surface 16 where they combine with the platinum to form an oxide therewith. Of course, in some cases the platinum layer 16 is not deposited onto the stainless steel electrode 12. In this instance, the oxygen combines with the stainless steel forming a ferrous oxide. The direct current voltage is maintained for a sufficient time to allow formation of a thin film 60, as schematically illustrated in FIGURE 5. This film includes both oxides and relatively free oxygen, with the free oxygen being shown schematically as a plurality of circles 62. The direct current glowing operation, in practice, is continued for approximately 3 minutes and the resulting oxide film 60 has a thickness of only a few microns. The entrapped, or absorbed, free oxygen 62 has detrimental effects because is can migrate later from the film 60 to the chamber 10. The presence of oxygen gas in the counter produces changes in tube characteristics and in the form of the gas discharge pulses because oxygen has a very large electron attachment coefficient. The next step is primarily directed toward removal of the unwanted free, or uncombined oxygen 62 within film 60.

II. HIGH TEMPERATURE PURGE

As previously mentioned, the free oxygen represented as circle 62 within film 60 is undesirable since it can migrate and enter the chamber 10. Accordingly, the next step in the present invention is purging the oxygen from the chamber 10. The tube A is heated to a temperature in the range of 300° C.–450° C., and a high vacuum pump is communicated with the chamber 10. The chamber is then continuously out-pumped, that is the gas of the chamber is drawn out by vacuum pumps with the chamber closed except at the pump. The high temperature of film 60 causes migration of the free oxygen 62 to the surface where it is carried away by the out-pumping operation. This substantially eliminates free, uncombined oxygen in the exposed surface of film 60. In practice, the tube A is heated within a furnace to approximately 400° C. and the out-pumping is continued for approximately 2 hours. As mentioned before, the tube or film 60 may be heated to a temperature within the range of 300° C.–450° C. At the lower temperatures a longer out-pumping time is used. For instance, if the temperature is in the neighborhood of 350° C., the out-pumping is continued for 3–4 hours. If the temperature of the tube or film is approximately 450° C., the out-pumping may accomplish the desired elimination of free oxygen from film 60 in a time as low as approximately one hour. In between these high and low temperatures of the purging or out-pumping operation, the pumping time varied generally inversely with the temperature. It is well within the knowledge of a person skilled in this art, after considering this discussion, to select the desired out-pumping or purging time for this high temperature purging operation. This step alone has been found to substantially improve the high temperature operation of a tube; however, in accordance with the present invention, other processing steps are contemplated.

III. QUENCH GAS FLOWING

After the film 60 has been treated at high temperature to remove the uncombined oxygen, the chamber 10 is filled with a gaseous material including a halogen, such as bromine. This halogen is the same as the quenching gas to be used later in the tube A. In practice, the gaseous material includes 90% neon and 10% bromine. A high frequency power source is then coupled across the connections 18, 23. This power source, in practice, has an output in the range of 30–40 megacycles, and it causes the quenching halogen and the neon to glow within the chamber 10. A high frequency power source is used for glowing the tube in the quenching gas atmosphere because it has been found that this produces a more stable final, surface. In addition, direct current glowing of the chamber when it is filled by a gaseous material including a quenching halogen would probably result in localized glowing or discharge. This would not provide uniform treatment of film 60. It has been found that high frequency glowing of the tube A causes a substantially even glowing through the complete extent of the chamber 10.

In practice, the high frequency glowing is continued for approximately 1½ minutes. It is appreciated that this time can be varied somewhat. If the high frequency glowing time is too short, the film 60 will not be saturated with a sufficient amount of halogen to stabilize the film 60. On the other hand, if the glowing time is too long, too much halogen is absorbed by the film 60. This excessive halogen would be released into the chamber 10 during subsequent use of the tube A. The amount of quenching gas would then be increased within the chamber 10, and changes in the operating characteristics of the tube A would occur. The glowing time in the quenching gas atmosphere must, therefore, be controlled to saturate the film 60 without depositing a large excess of halogen within the film. The time of 1½ minutes has proven satisfactory to reach this result.

IV. MEDIUM TEMPERATURE PURGE

After the high frequency glowing operation, the gaseous material is purged or pumped from chamber 10. This purging operation removes the quenching gas atmosphere from the ionization chamber. It has been found that, irrespective of the steps taken to control the high frequency glowing of the tube, a certain limited amount relatively mobile free halogen is entrapped within film 60. In other words, the saturation point of film 60 is exceeded. To remove this halogen before the tube is used, the chamber 10 is out-pumped by an appropriate mechanism, while the surface or film 60, and indeed the tube A, is heated to a temperature in the range of 50° C.–150° C. This out-pumping or purging of chamber 10 is preferably continued for approximately ½ hour. Referring again to FIGURE 5, the free halogen, i.e. bromine, is caused to migrate from film 60 during the out-pumping, in a manner similar to the migration of the free oxygen during the high temperature purging of the chamber 10, as previously described. In practice, this purging or out-pumping takes place with the surface 60 maintained at a temperature of approximately 100° C. Longer out-pumping times are possible; however, most of the unwanted mobile bromine within the surface or film 60 is removed within approximately ½ hour.

V. FILL AND SEAL TUBE

The next operation in the production of the improved Geiger-Mueller counting tube is filling the chamber 10 with the actual operating gaseous material. Although this gaseous material may take a variety of forms, in the preferred embodiment of the invention, the gaseous material is a mixture including approximately 0.1% argon, 1.5% bromine and the remainder neon. Other halogens, such as chlorine, could be substituted for the bromine; however, the halogen used in the high frequency glowing operation should be the same halogen used in the operation of the tube. Bromine provides a longer life for the tube and is better for high temperature operation than a more active halogen, such as chlorine. After the chamber 10 has been filled, seal 52 is formed on the end of spout 50, in a manner well known in the art. This entraps the operating gaseous material within the chamber 10. Various other operating gases are well within the contemplation of the present invention; however, the neon-argon-bromine gaseous material has proven quite satisfactory.

VI. THERMAL CYCLING

After the tube has been filled with the operating gaseous material and sealed as previously mentioned, a critical aspect of the present invention is then performed. The tube A is gradually heated in a furnace to a temperature $t_1$ substantially lower than the desired maximum operating temperature $t_0$ of the tube. Thereafter the furnace is allowed to cool. This gradually cools the tube to approximately room temperature. After this has been done, the furnace is again fired to gradually raise the temperature of the tube A to a temperature $t_2$ still substantially below the desired maximum operating temperature $t_0$ and above the first temperature $t_1$. The tube is then allowed to cool by cooling of the furnace. In other words, the tube A is thermally cycled to progressively higher temperatures and allowed to cool gradually. Each successive thermal cycle involves heating the tube to a temperature higher than the previous heating cycle until the maximum operating temperature $t_0$ is approached or exceeded. It has been found in practice that this thermal cycling of the filled counting tube requires at least 3 cycles before a temperature approximating the maximum operating temperature $t_0$ is used in the heating portion of the cycle. This operation can be better understood by the following example:

The tube A is gradually heated to a temperature $t_1$ which is approximately 175° C., and the tube is then allowed to cool within the furnace. Thereafter, the same tube is gradually heated to a temperature $t_2$ which is 220° C., and the tube is allowed to cool in the furnace. Then the tube is heated to a temperature $t_3$ which is approximately one-third the way between 220° C. and 350° C., the desired maximum operating temperature $t_0$ of tube A. Thereafter, the tube is cooled and again heated. This time the tube is heated to a temperature $t_4$ which is approximately two-thirds of the way between 220° C. and 350° C. After the tube is again cooled, the tube is heated to a temperature $t_5$ which is approximately 350° C., or $t_0$. The tube is again allowed to cool. This tube is then ready to be operated in a temperature range at least approaching 350° C., or $t_0$.

In summarizing the thermal cycling operation, it can be said that the tube is heated gradually to a temperature $t_1$ and allowed to cool gradually. This thermal cycling is repeated $n$ times with the heating being to successively higher temperatures $t_2, \ldots t_n$. In practice, it has been found that $n$, the number of thermal cycles, should be at least 3 and preferably 4–5, and $t_n$ is approximately $t_0$. This operation provides a bromine oxide rich film 60 which may have, as a primary composition either platinum, when this metal is used on the surface of the electrode 12, or stainless steel, when no platinum layer is provided. Each successive thermal cycle of the tube A apparently increases gradually the thickness of the bromine, oxide rich film 60 and, stabilizes this layer to prevent secondary emissions and migration of oxygen having a large electron attachment coefficient. Also, the bromine oxide rich film 60 apparently decreases to a drastic extent the rate of halogen reaction with the film during operation of tube A. All of these functions, and possibly others, tend to increase the maximum operating temperature of tube A.

Figure 3:
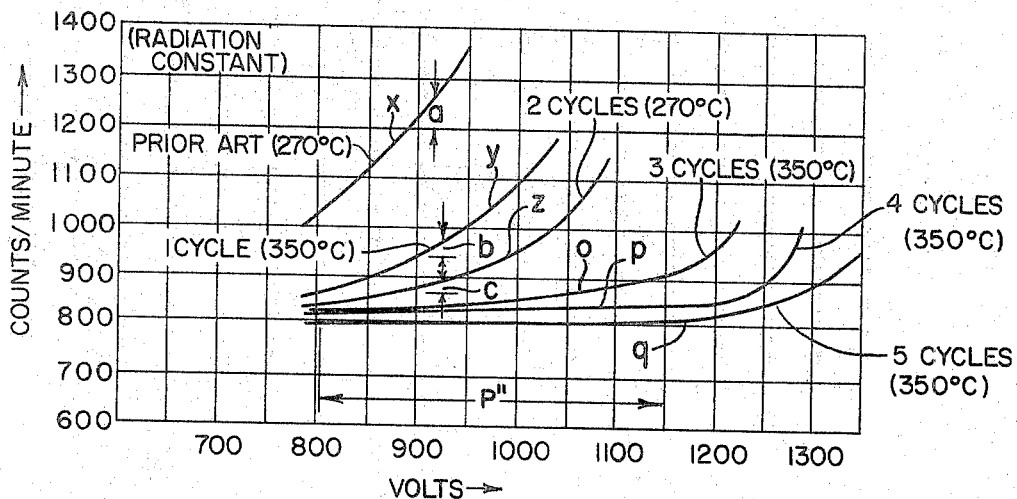
FIGURE 3 is a graph illustrating further characteristics of a tube processed in accordance with the prior art and of a tube processed in accordance with the present invention.

As mentioned before, the tube A should be thermally cycled at least 3 times before reaching the desired maximum operating temperature of the tube. This limitation has been obtained by experimentation, although each cycle improves to an extent the high temperature characteristic of the tube. The results of this experimentation are schematically represented on the graph illustrated in FIGURE 3. Curve $x$ represents the prior art when operated at a temperature of 270° C. The slope of the curve, represented as $a$, is substantially large, and there is no distinct plateau. For this reason, the prior tubes, as previously described, are not satisfactorily operated at 270° C. Now referring to curve $y$. This curve represents a tube A processed in accordance with the method explained above with the exception that the tube was heated gradually to approximately 200° C. and gradually cooled. In other words, the tube which produced curve $y$ was thermally cycled only 1 time. This curve had a slope represented by $b$. Although the slope of curve $y$ is somewhat more gradual than the slope of curve $x$, still there is no distinct plateau and the tube represented by this curve is not well adapted for operation at 270° C., and thus not at 350° C.

Referring now to curve $z$, this curve represents a tube A processed in accordance with the present invention with the exception that the tube was thermally cycled only 2 times. In other words, the tube was heated to a temperature $t_1$ below the maximum operating temperature, i.e. 200° C. and then gradually cooled. Thereafter, the tube was heated to 250° C., and gradually cooled. Curve $z$ represents this tube tested at 350° C. after the above-mentioned thermal cycling. Slope of curve $z$ is represented by $c$, and this slope, although better than the slope of curve $x$ and $y$, is still not sufficiently small to allow efficient and accurate operation of the tube A at 350° C.

Now referring to curve $o$, a tube A was thermally cycled 3 times from a relatively low temperature of 200° C. then to 250° C., and then to 300° C. This curve now has a relatively flat portion which does form a distinct plateau. Consequently, the tube represented by curve $o$ would be adapted for use as a counting device at a temperature of 350° C. This is substantially higher than the previous maximum operating temperature of approximately 175° C. For this reason, it is submitted that the thermal cycling should be done at least 3 times with the heating temperature being increased successively. The first temperature $t_1$ should be in the range of 150° C.–200° C. and the temperatures $t_n$ of the remaining cycles should increase substantially proportionally to the desired maximum operating temperature $t_0$. Curves $p$ and $q$ represent tubes which have been thermally cycled 4 and 5 times, respectively. It is obvious that these tubes, so treated, provide a long relatively flat plateau when operated at 350° C. From the experimentation resulting in the production of the graph illustrated in FIGURE 3, it is submitted that, in accordance with the preferred embodiment of the invention, 4–5 thermal cycles should be used. However, in its broadest sense, 3 thermal cycles appear to produce a relatively flat plateau at temperatures heretofore impossible with known Geiger-Mueller counting tubes. In addition, with only one thermal cycle, as shown in curve $y$, some improvement in the high temperature operation of the tube is noted.

*Specific example*

In accordance with one specific example of the present invention, a tube A was first out-pumped at 300° C. for approximately 2 hours to remove gases absorbed by the inner surface of the chamber, the chamber was then filled with oxygen at a pressure of approximately 3 mm. Hg, and a direct current source of approximately 700 volts was applied across connections 18, 23. This caused the tube to glow, and the glowing was continued for approximately 3.0 minutes. Thereafter, the tube A was placed in a furnace and heated to a temperature of approximately 400° C. While at this temperature, the chamber 10 was out-pumped for approximately 2 hours. Thereafter, the tube A was filled with a gaseous material containing approximately 10% bromine and 90% neon. A high frequency source having an output between 30–40 megacycles was then coupled across the connections 18, 23. This caused the tube to again glow, and this glowing was continued for approximately 1½ minutes.

After the high frequency glowing, the tube was again heated, this time to approximately 100° C., and the chamber 10 was again out-pumped. This time for approximately ½ hour. After the out-pumping operation, the tube was filled with a gaseous material including 0.1% argon, 1.5% bromine, and the rest neon. After being filled with this gaseous material, the tube was permanently sealed at seal 52. Thereafter, the tube A was placed in a furnace heated to approximately 175° C. The tube was then cooled in the furnace. Thereafter, the tube was heated to a temperature of approximately 220° C., and it was again cooled in the furnace. This cycling was changed with the heating being to successively higher temperatures until 5 cycles were completed. On the fifth cycle, the tube A was heated to a temperature of approximately 350° C.

Referring now to FIGURE 2, the operating characteristics of the above-mentioned specific example of the present invention are compared with the operating characteristics of the prior art Geiger-Mueller counting tube. Curves $r$ and $s$ represent the function of the specific example tube. At room temperature, the tube has a plateau with a length of approximately 400 volts. The slope of this room temperature curve is substantially less than the slope of the room temperature curve $n$ of the prior art tube. At 350° C., the subject tube exhibited a plateau substantially 275 volts in length. This plateau again exhibited a relatively small slope. When this curve $s$ is compared with the prior art curve $m$, the advantages of the present invention are readily appreciated. Another interesting aspect of a tube constructed in accordance with the present invention is that the plateaus are shifted vertically only a slight amount when the ambient temperature is changed from room temperature to 350° C. Thus, the change in sensitivity is relatively unaffected by temperature changes. This means that the tube will be accurate over a wide range of operating temperatures, as well as over a wide range of applied voltages.

The present invention has been described in connection with a specific embodiment of the invention; however, it will be appreciated that various changes may be made in this embodiment without departing from the intended spirit and scope of the present invention.

Having thus described my invention, I claim:

1. A method of increasing the maximum operating temperature of a radiation detection device including a chamber, a large area electrode surface formed from a selected metal and located in said chamber, and an electrode in said chamber and spaced from said surface, said method comprising the following steps:
    (a) filling said chamber with a gaseous material including at least some halogen gas;
    (b) passing an electrical current between said electrode and said electrode surface to cause said halogen gas to be absorbed by said selected metal;
    (c) purging said gaseous material from said chamber;
    (d) filling said chamber with a second gaseous material which is to be ultimately used in said chamber, said second gaseous material including at least some of said halogen gas;
    (e) sealing said chamber;
    (f) heating said device gradually to a temperature $t_1$ and allowing said device to cool; and,
    (g) repeating said heating and cooling step $n$ times with said heating being to successively higher temperatures $t_2, \ldots t_n$, with $n$ being at least 3 and $t_n$ being a temperature generally equal to or higher than the desired maximum operating temperature for said device.

2. A method as defined in claim 1 wherein $n$ is greater than 3.

3. A method as defined in claim 1 wherein said halogen is bromine.

4. A method as defined in claim 1 wherein said second gaseous material includes neon.

5. A method as defined in claim 1 wherein said second gaseous material includes argon.

6. A method as defined in claim 1 wherein $t_1$ is less than 200° C.

7. A method as defined in claim 1 wherein $t_n$ is less than 400° C.

8. A method as defined in claim 1 wherein said electrical current is a high frequency alternating current.

9. A method as defined in claim 1 wherein said electrical current is passed between said surface and said electrode for a time of approximately 1½ minutes.

10. A method as defined in claim 1 wherein said purging step is at a temperature in the range of 50° C.–150° C.

11. A method as defined in claim 10 wherein said purging step involves out-pumping for a selected time.

12. A method as defined in claim 11 wherein said time is approximately ½ hour.

13. A method as defined in claim 1 wherein $t_1$ is approximately 175° C.

14. A method as defined in claim 1 wherein $t_2$ is approximately 220° C.

15. A method as defined in claim 14 wherein $t_1$ is approximately 175° C.

16. A method as defined in claim 1 including the following initial steps:
 (a) filling said chamber with oxygen gas;
 (b) passing a current between said surface and said electrode to cause oxidation of said surface; and,
 (c) purging said oxygen from said chamber.

17. A method as defined in claim 16 wherein said electrical current is direct current.

18. A method as defined in claim 16 wherein said oxygen purging step is out-pumping.

19. A method as defined in claim 18 wherein said out-pumping is continued for approximately 1–4 hours at 300° C.–450° C.

20. A method as defined in claim 18 wherein said out-pumping is continued for approximately 2 hours at approximately 400° C.

21. A method as defined in claim 1 wherein said selected metal is platinum.

22. A method of treating the large area metal surface of the electrode of a radiation counting device, said method comprising the following steps:
 (a) subjecting said surface to a halogen gas atmosphere;
 (b) causing said metal surface to absorb said halogen;
 (c) purging said atmosphere from said surface;
 (d) subjecting said surface to an atmosphere to be ultimately used in said counting device;
 (e) heating said surface gradually to a temperature $t_1$ and allowing said surface to cool; and,
 (f) repeating said heating and cooling step $n$ times with said heating being to successively higher temperatures $t_2, \ldots t_n$, with $n$ being at least 3 and $t_n$ being a temperature generally equal to or higher than the desired operating temperature of said device.

23. A method as defined in claim 22 wherein $n$ is greater than 3.

24. A method as defined in claim 22 including the following initial steps:
 (a) oxidizing said metal surface; and,
 (b) flushing said surface at a temperature exceeding approximately 300° C.

25. A method of increasing the maximum operating temperature of a Geiger-Mueller counting tube including a chamber, an outer electrode surface surrounding said chamber and formed from a selected metal, and an electrode within said chamber and surrounded by said chamber, said method comprising the following steps:
 (a) filling said chamber with oxygen;
 (b) applying a voltage generally in the range of 500–1000 volts across said surface and said electrode to oxidize said selected metal of said surface;
 (c) out-pumping said oxygen at a temperature range of 300° C.–450° C. for a time generally exceeding one hour;
 (d) filling said chamber with a first gaseous material containing at least some of a selected halogen;
 (e) applying a high frequency voltage across said surface and said electrode for a time sufficient to at least partially saturate said surface with said halogen;
 (f) out-pumping said first gaseous material for a short time at a temperature approximately in the range of 50° C.–150° C.;
 (g) filling said tube with a second gaseous material including at least monatomic gas and said selected halogen;
 (h) heating said counting tube gradually to a temperature $t_1$ and allowing said tube to cool; and,
 (i) repeating said heating and cooling step $n$ times with said heating being to successively higher temperatures $t_2, \ldots t_n$, with $n$ being at least 3 and $t_n$ being a temperature generally equal to or greater than the desired maximum operating temperature.

26. A method as defined in claim 25 wherein said selected halogen is bromine.

27. A method as defined in claim 25 wherein said high frequency is in the range of 30–40 megacycles.

28. A method as defined in claim 25 wherein $n$ is in the range of 4–5.

29. A method of treating the inner metal surface of the outer electrode in a Geiger-Mueller counting tube having a desired maximum operating temperature, said method comprising the following steps:
 (a) oxidizing said metal surface with substantially pure oxygen;
 (b) heating said surface to expel free oxygen;
 (c) causing high temperature absorption of a selected halogen by said metal surface; and,
 (d) thermally cycling said surface in an atmosphere of a noble gas and said halogen by heating said surface to a temperature $t_1$ and allowing said surface to cool, then repeating said heating and cooling cycle $n$ times to successively higher temperatures $t_2, \ldots t_n$ with $n$ being at least 3 and $t_n$ being a temperature generally equal to or higher than the desired maximum operating temperature.

30. A method of increasing the maximum operating temperature of a radiation detection device including a chamber, a large area electrode surface formed from a selected metal, and an electrode in said chamber and spaced from said surface, said method comprising the following steps:
 (a) oxidizing said surface;
 (b) removing free oxygen from said surface;
 (c) filling said chamber with a gaseous material including at least a selected halogen gas;
 (d) causing said halogen gas to be absorbed into said surface to approximately the saturation of said metal;
 (e) removing free halogen gas from said surface;
 (f) filling said chamber with a second gaseous material which is to be ultimately used in said chamber, said second gaseous material including at least some of said selected halogen gas;
 (g) heating said device gradually to a temperature generally equal to a temperature higher than the desired maximum operating temperature; and,
 (h) gradually cooling said device.

No references cited.

RICHARD H. EANES, JR., *Primary Examiner.*